(12) United States Patent
Fisher et al.

(10) Patent No.: US 7,696,715 B2
(45) Date of Patent: Apr. 13, 2010

(54) POWER CONTROL FOR INDUCTION MOTORS USING VARIABLE FREQUENCY AC POWER

(75) Inventors: Robert E. Fisher, Everett, WA (US); John T. Paterson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 18 days.

(21) Appl. No.: 11/527,067

(22) Filed: Sep. 26, 2006

(65) Prior Publication Data

US 2008/0074076 A1    Mar. 27, 2008

(51) Int. Cl.
*H02P 27/04* (2006.01)

(52) U.S. Cl. ............... 318/802; 318/801; 318/800; 318/799; 318/798; 318/767

(58) Field of Classification Search ........... 318/801, 318/802, 729, 773, 800, 799, 798, 767, 727
See application file for complete search history.

(56) References Cited

U.S. PATENT DOCUMENTS

| | | | | |
|---|---|---|---|---|
| 3,731,169 A | * | 5/1973 | Burgholte et al. | 318/801 |
| 3,753,060 A | * | 8/1973 | Greenwell | 318/801 |
| 4,420,718 A | * | 12/1983 | Sakai et al. | 318/729 |
| 4,465,961 A | * | 8/1984 | Landino | 318/811 |
| 4,509,004 A | * | 4/1985 | Shepard, Jr. | 318/801 |
| 4,816,723 A | * | 3/1989 | Shields et al. | 388/812 |
| 4,901,001 A | * | 2/1990 | Saito et al. | 318/779 |
| 5,335,189 A | * | 8/1994 | Takayama et al. | 702/96 |
| 5,672,950 A | * | 9/1997 | Kemp et al. | 318/801 |
| 5,729,118 A | * | 3/1998 | Yanagisawa et al. | 322/29 |
| 5,880,571 A | * | 3/1999 | Seffernick et al. | 318/773 |
| 6,060,860 A | * | 5/2000 | Itoh et al. | 318/809 |
| 6,384,568 B1 | * | 5/2002 | Schubert | 318/808 |
| 6,469,469 B1 | * | 10/2002 | Chambers et al. | 318/801 |
| 6,570,778 B2 | * | 5/2003 | Lipo et al. | 363/41 |
| 6,750,629 B2 | * | 6/2004 | Shigemizu et al. | 318/801 |
| 6,998,802 B2 | * | 2/2006 | Nishikawa | 318/400.26 |
| 2003/0094919 A1 | * | 5/2003 | Shigemizu et al. | 318/801 |
| 2003/0138327 A1 | * | 7/2003 | Jones et al. | 417/42 |
| 2005/0218864 A1 | * | 10/2005 | Eguchi | 318/807 |

OTHER PUBLICATIONS

"Induction Motors", Ch. 14, from *Applied Electricity*, H. Cotton, Cleaver-Hume Press, 1957.
"Electric Motor Handbook", McGraw-Hill Professional, 1998.
"Theory and Design of Small Induction Motors", MCGraw-Hill, 1959.
"Controls for Induction Motors", Andrej Trzynadhowski, Elsevier, 2002.

* cited by examiner

*Primary Examiner*—Bentsu Ro
*Assistant Examiner*—David S Luo
(74) *Attorney, Agent, or Firm*—Tung & Associates

(57) ABSTRACT

An autonomous controller allows an AC induction motor to operate over a broad range of AC power supply frequencies by reducing the amount of current supplied to the motor at lower frequencies. The controller detects the frequency of the power supply and switches the supply current on and off during each AC cycle to limit the RMS current to a value that is related to the detected frequency. Alternatively, the controller switches capacitive reactance into the power supply circuit which reduces the current supplied to the motor at lower AC frequencies.

11 Claims, 6 Drawing Sheets

POWER CONTROL FOR INDUCTION MOTORS USING VARIABLE FREQUENCY AC POWER

BACKGROUND OF THE INVENTION

1. Field of the Invention

This invention broadly relates to AC induction motors, and deals more particularly with controlling the delivery of AC power to the motor from a variable frequency power supply to avoid excess current at lower frequencies.

2. Description of the Related Art

Electrical AC induction motors are often used for higher power electrical motor applications where polyphase electrical power is available. The phase differences between the 3 phases of the polyphase electrical power source creates a rotating electromagnetic field in the motor. This rotating magnetic field induces a current in the conductors in the rotor which in turn sets up a counterbalancing magnetic field that causes the rotor to turn in the direction the field is rotating. Induction motors are produced in standardized frame sizes making them nearly interchangeable between manufacturers and widely used throughout industry for many applications. AC induction motors using a single phase power source are also available in which the rotating magnetic field is produced using any of several techniques.

Induction motors are designed to operate at a synchronous speed using a fixed frequency/fixed voltage AC power supply, such as 60 cycles or 400 cycles per second. Induction motors operate with a small amount of "slip percentage" from the supply frequency, typically 5 to 10%, so that if the load increases, the motor slows slightly, and the slip percentage increases, which in turn increases the motor torque to compensate for the increased torque load. FIG. 1 illustrates the concept of the slip percentage, in which the motor torque 20 is plotted as a function of motor speed. A typical load is shown at 26 along with plots of the maximum and minimum loads 22, 24, respectively. The synchronous frequency of the motor is shown as $f_o$. From the torque curve 20 shown in FIG. 1, it can be seen that the area of slip percentage 28 increases with higher loads and slower speeds. Thus, in effect, synchronous induction motors utilize a simple, self regulating system when operating from a fixed frequency, AC power supply.

Using a fixed frequency power supply, induction motors are self regulating for both speed and power, making them suitable for use in a wide range of applications, including aircraft applications such as fuel pumps and hydraulic pumps. In some applications, however, such as in commercial and military aircraft, induction motors must be powered by variable frequency power supplies. Problems are presented by the use of variable frequency power supplies due to the non-linear relationship between the amounts of current drawn by the motor at different AC frequencies. This nonlinear relationship is illustrated in FIG. 2 which depicts motor torque curves 30 at four differing power supply frequencies. A plot of the motor current is shown at 32 as a function of motor speed. Also, the maximum and minimum loads are shown at 22 and 24 respectively. From FIG. 2, it can be seen that the available slip percentage 28 decreases with motor speed while the current drawn by the motor increases nonlinearly. In fact, motor current can increase by the inverse ratio of the frequency-squared with decreasing motor speed, resulting in overheating of induction motors at the lower frequencies.

At variable frequencies over a range greater than 1.7:1, induction motors are designed for optimum performance at the highest frequency but exhibits inferior performance characteristics at lower frequencies. Thus, where it is impractical to use motor controllers, the selection of a motor for a given application represents the best compromise possible since most induction motors are standard, off-the-shelf commercial products intended for a wide range of use. The selection of standardized induction motors for aircraft applications is particularly difficult since the variable frequency ratio can be as high as 2.2 from about 360-800 Hz. As a result, motors intended to operate at 800 Hz have high current and slip issues when operating at 360 Hz.

One remedy for the problems discussed above involves the use of solid state motor controllers which rectify the variable AC frequency and convert it to a constant frequency. This is accomplished by rectifying the variable frequency power into DC and then synthesizing AC power that matches the motor requirements. This solution, however, is relatively expensive because of the number of components that are required and thus is not suitable for solving the problem in smaller induction motors since the cost of the controller can exceed that of the motor itself.

Another solution to the problem consists of providing a cooling system for the motor which draws away excess heat generated by high current levels at lower speeds. Such cooling systems not only add to cost, but are bulky and add undesirable weight in aircraft applications.

Accordingly, there is a need for a power control for induction motors that avoids the problems discussed above, which is simple in construction and is also both cost effective and light weight. The present invention is directed towards satisfying this need.

BRIEF SUMMARY OF THE INVENTION

In accordance with one aspect of the invention, a device is provided for controlling variable frequency AC power supplied to an AC induction motor. The device comprises a detector for detecting the frequency of AC power supply to the motor, and a control circuit for controlling the current supplied to the motor based on the detected frequency. The control circuit includes an analog-to-digital converter for converting the analog value of the detected frequency to a digital value, a timing pulse generator for generating timing pulses related to the value of the detected frequency, and a switch responsive to the timing pulses for switching the power to the motor. The switch may comprise a transistor or a SCR. The control circuit may include an adjustment for adjusting the timing of the pulses based on the characteristics of the particular motor. A stored algorithm may be used to calculate the timing pulses. The control circuit may include capacitive reactance and a switching circuit responsive to the detected frequency for switching capacitive reactance into the circuit between the power supply and the motor in order to limit current at lower frequencies.

In accordance with another aspect of the invention, a device is provided for controlling power supplied by an AC power source to an induction motor over a range of frequencies. The device includes a circuit containing capacitive reactance coupled between the AC power source and the motor for limiting the current supplied to the motor from the AC power source at lower frequencies. The capacitive reactance is larger than the value of the inductive reactance of the motor at middle and upper frequencies in the range. A detector detects the frequency of the power supplied by the AC power source, and a switch is used to selectively couple the capacitive reactance into the power supply circuit based on the detected power supply frequency.

In accordance with a further aspect of the invention, a method is provided for controlling power supplied by an AC power source to an induction motor over a range of frequencies. The method includes the steps of detecting the frequency of the AC power being supplied to the motor, and reducing the current supplied by the AC power source to the motor based on the detected frequency. The current is reduced by generating a set of timing pulses related to the detected frequency and switching the power supply from the source to the motor on and off using timing pulses during each cycle of the supplied power.

According to still a further aspect of the invention, a method is provided for controlling power supplied by an AC power source to an induction motor over a range of frequencies. The method includes introducing capacitive reactance between the AC power source and the motor in order to limit the current supplied to the motor from the power source at lower frequencies. The value of the capacitive reactance is larger than the reactance of the motor at midrange and lower frequencies. The capacitive reactance may be introduced by switching one or more capacitors into a circuit connecting the power source with the motor.

The power control of the present invention is particularly advantageous because its simplicity of construction and operation. The power control is autonomous, in that external inputs or control signals are not required. The current drawn by the motor is reduced at lower frequencies, thus eliminating the need for cooling systems to draw away heat generated by excess current.

These and other features, aspects and advantages of the invention will become better understood with reference to the following drawings, description and claims.

DETAILED DESCRIPTION OF THE INVENTION

Figure 1:
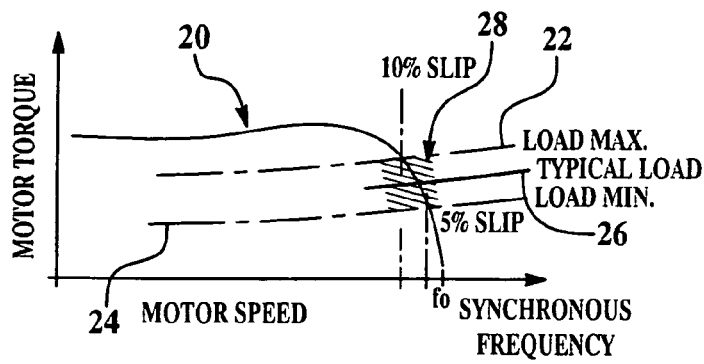
FIG. 1 is a waveform diagram showing motor torque as a function of motor speed for a typical AC induction motor powered at a single AC frequency in accordance with the prior art.
Figure 2:
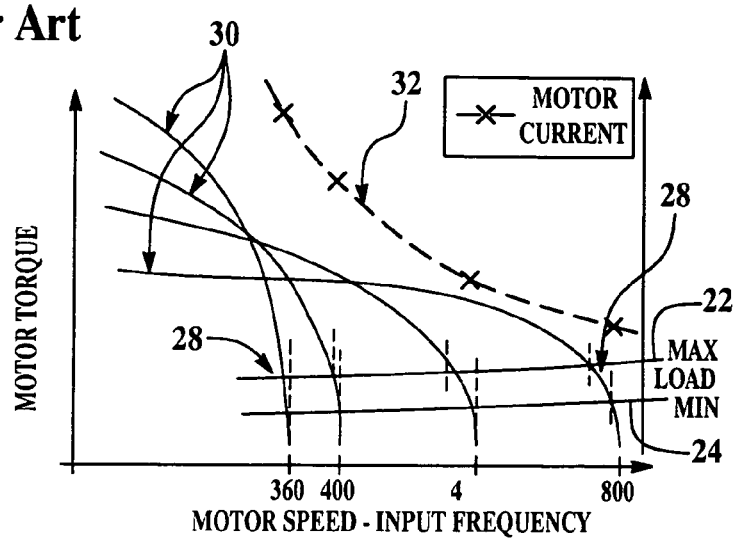
FIG. 2 is a waveform diagram similar to FIG. 1 but showing motor torque curves at multiple input frequencies, along with motor current.

Referring first to FIGS. 3-6, the present invention relates to a power controller 44 for controlling power delivered from a variable frequency, AC power source 42 to a three phase, AC induction motor 46 which drives a load 48. The power source 42 delivers AC power at any of a number of frequencies on each of three phases 42 designated as phases A, B and C in FIGS. 5 and 6. As will be discussed later in more detail, the power controller 44 functions to reduce the magnitude of current delivered to the motor 46 at lower frequencies in the range of frequencies at which power may be provided by the AC source 42. It should be noted here that although the invention will be described herein in connection with its application to a three phase induction motor driven by a three phase AC power source, the inventive power control can be also be used with single phase induction motors driven by a single phase AC power source.

Figure 6:
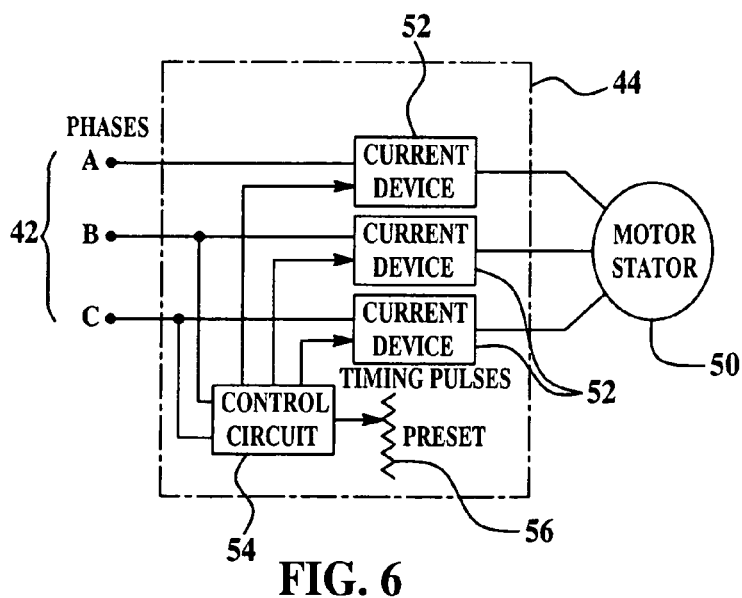
FIG. 6 is a block diagram of the preferred form of the power controller of the present invention.

As will become apparent from the following description, the power controller 44 shown in FIG. 6 is implemented using analog circuits that are both simple in design and cost effective to implement. The power controller 44 includes three current control devices 52 respectively coupled in series between the three phases from source 42 and the stator 50 of the motor 46. The current control devices 52 receive control signals from a control circuit 54 having inputs connected to phases B and C of the power source 42. The control circuit 54 detects the frequency of the power being supplied by the source 42 to the motor stator 50, delays each phase of the supplied power by an amount related to the detected frequency, and generates timing pulses that are used to control the current control devices 52.

Figure 7:
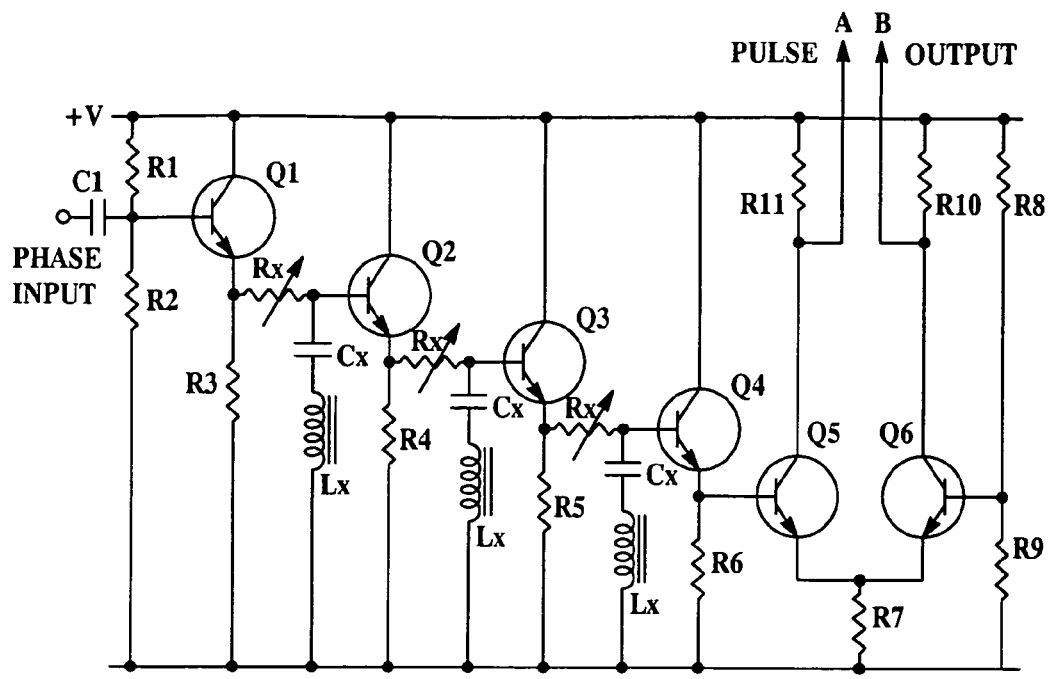
FIG. 7 is a detailed schematic diagram of one of the control circuits used in the power controller shown in FIG. 6.
Figure 8:
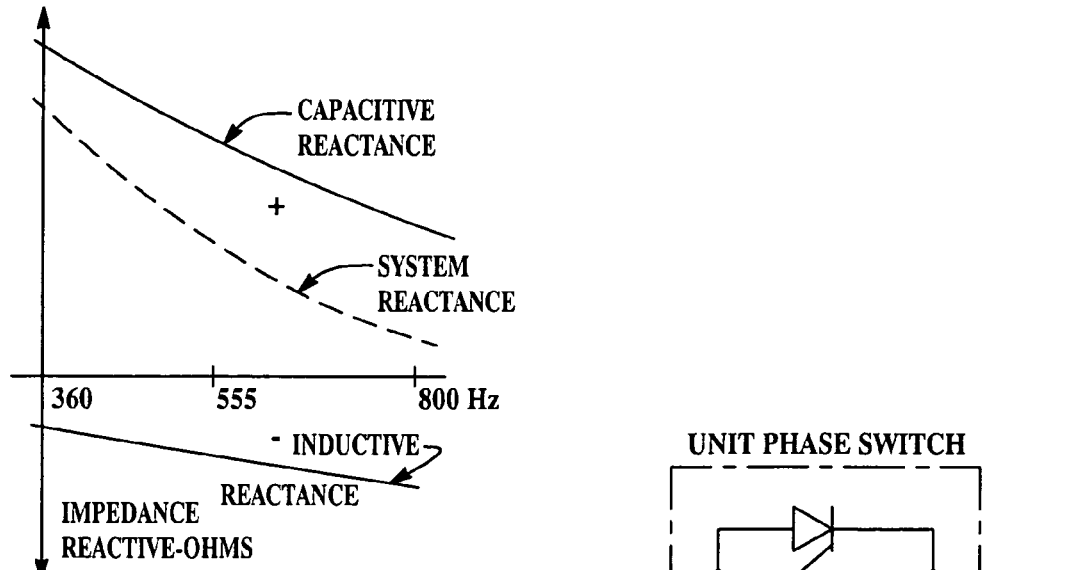
FIG. 8 is plot of impedance versus input frequency showing the relationship between capacitive and inductive reactance for the power controller of FIG. 6.
Figure 9:
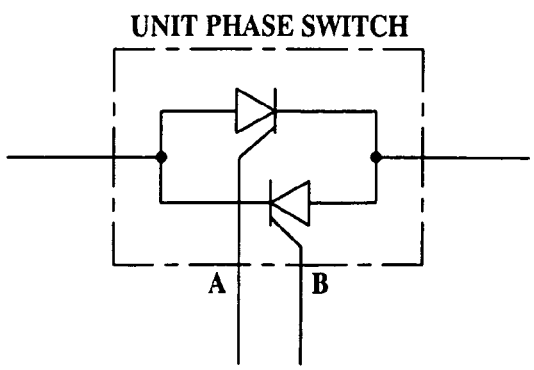
FIG. 9 is a detailed schematic diagram of a current switch device used in the power controller of FIG. 6.

The control circuit 54 may comprise one of the circuits shown in FIG. 7 for each phase of the supplied power. Thus, for the 3-phase power source shown in FIG. 6, three of the circuits shown in FIG. 7 would be used. The circuit shown in FIG. 7 comprises three R-L-C networks 47 which directly produce a non-linear phase-shift/frequency response. This non-linear response is shown in FIG. 8. The transistorized 3-stage R-C-L phase-shifter (Q1, Q2, Q3) network creates the necessary phase-shift range of approximately 3-120 degrees for a frequency range of 800 Hz-360 Hz respectively. The R-L-C network (Rx, Lx, Cx) is an active LC network, where the selection of LC values is such that the impedance of the network is always capacitive in the useful frequency range, and the ratio (Xc−Xl)/Rx=tan(theta) is large at low frequency and small at high frequency, which is the phase shift required according to frequency; the variable resistors Rx in each of the 3-stages are mechanically connected together, so that minor adjustments to phase-shift pulse-timing can be made to suit the needs of a specific motor-load combination. A fourth stage 49 which includes transistor Q4 comprises an output driver for the emitter-coupled Q5, Q6 transistor output pair, provide the anti-phase pulses output on lines 51 to the current switching devices 52 used to switch the current for each phase of the power The current control devices 52 may comprise SCR (silicon controlled rectifiers), IGBT (insulated gate bipolar transistors), or FET (field effect transistors). The exact relationship between the timing pulses and the input frequencies can be adjusted using a voltage preset 56 in order to more precisely adapt the power controller 44 to a particular motor 46. FIG. 9 illustrates one suitable circuit for the current switching devices 52 shown in FIG. 6, which comprises a pair of coupled SCRs 53 (FIG. 9) whose gates are connected to the pulse outputs 51 of the circuit shown in FIG. 7.

Figure 4:
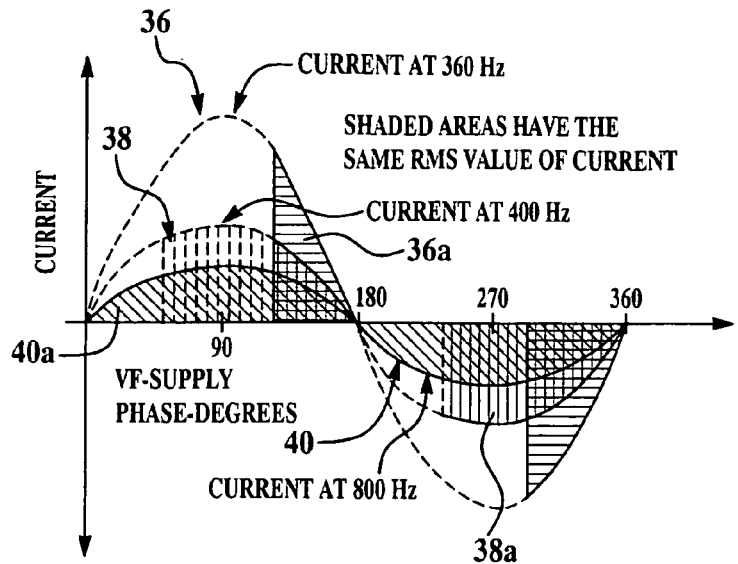
FIG. 4 is a waveform diagram of AC current supplied by a power supply at three different frequencies.
Figure 5:
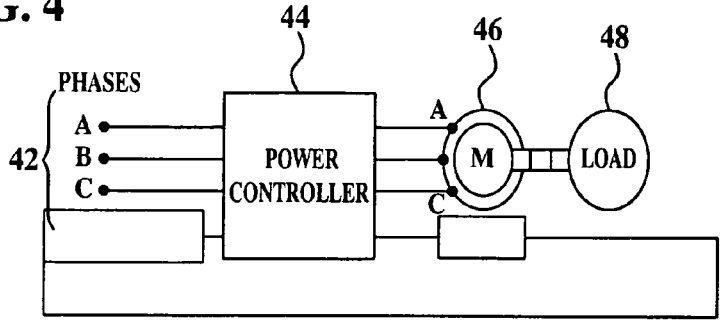
FIG. 5 is a simplified block diagram showing the power controller of the present invention in relation to an AC power source and a motor having a load.

FIG. 4 shows three waveforms 36, 38 40 representing AC current supplied from the power source 42 at three corresponding frequencies, herein shown as 360 Hz, 400 Hz, and 800 Hz. As shown by waveform 40, when the input frequency is relatively high (800 Hz), the frequency detector produces a series of timing pulses that switch the current control devices 52 on throughout each complete cycle of current. However, when the input frequency of the power is decreased to 400 Hz as shown by waveform 38, current control devices 52 are turned off during approximately the first 45 degrees of a cycle following which current control devices 52 are switched on until the phase reaches 180 degrees at which time the current control devices 52 are switched off for approximately 45 degrees and then switched back on.

In the case of power delivered at 360 Hz as shown by curve 36, the time delay before the current devices 52 are turned on is greater during both half cycles of the power. The shaded areas 36a, 38a, 40a respectively represent the duration during which current devices 52 are turned on to deliver current to the motor stator 50. Because of the differences in the timing pulses for these three input frequencies, the total amount of current is essentially the same for all three input frequencies. In other words, the shaded areas 36a, 38a, 40a all represent the same RMS value of current supplied to the motor stator 50.

Figure 3:
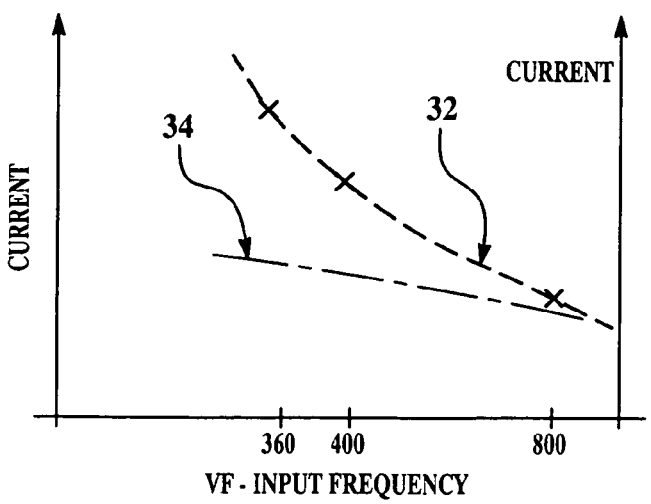
FIG. 3 is a plot of motor current as a function of input frequency, and showing the reduced requirement for motor current at lower frequencies using the power controller of the present invention.

FIG. 3 provides a comparison of the conventional motor current curve 32 with a plot 34 of the motor current as a function of frequency using the power controller 34 of the present invention. As it is apparent from FIG. 3, the power controller 44 is effective in reducing the level of current delivered to the motor stator 50 at lower frequencies. By progressively limiting the input current to the induction motor 46 at lower frequencies the resistive heat losses in the motor 46 are reduced, while providing adequate current for the true power needs of the motor 46. It is also important to note that the power controller 44 operates autonomously, adaptive to the variable frequency power, without the need for independent input controls, as are required in conventional solid state motor controllers.

Figure 10:
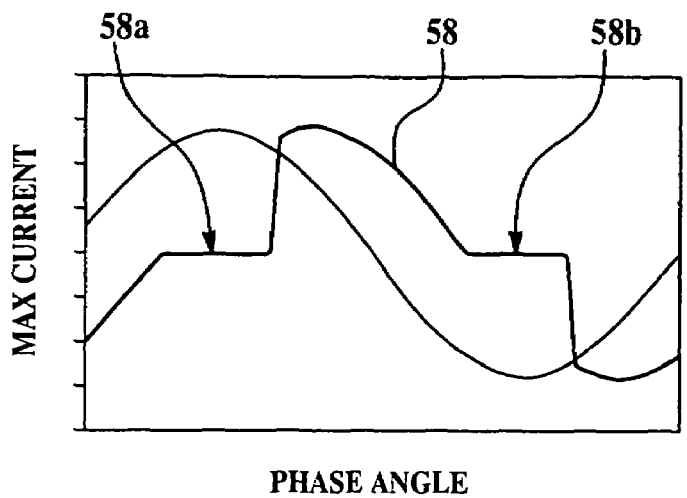
FIGS. 10-12 are waveform diagrams showing maximum motor current as a function of phase angle for three different input frequencies of power.
Figure 11:
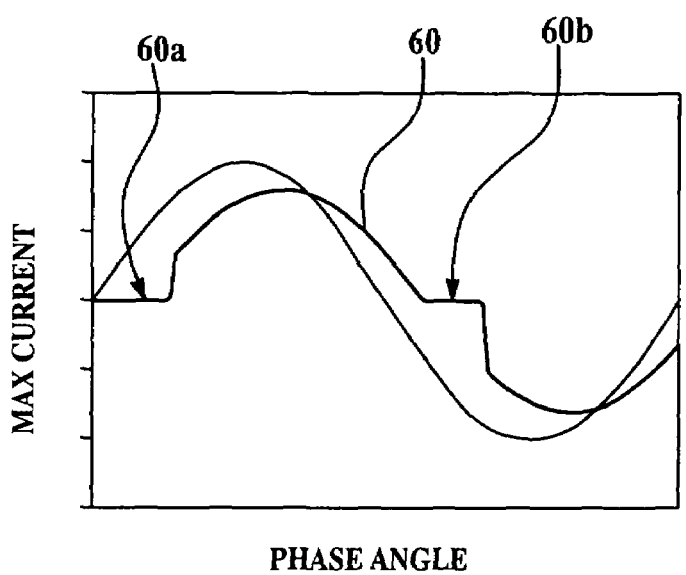
Figure 12:
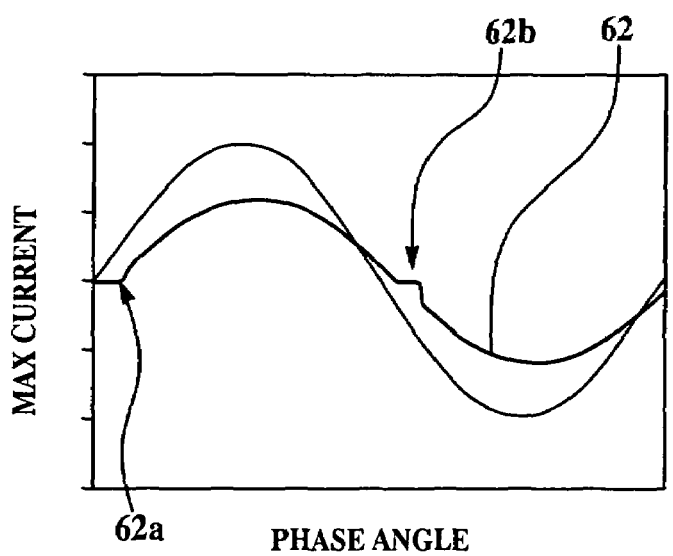

FIGS. 10, 11 and 12 are waveform plots showing maximum current versus phase angle, and displaying the effect of the power controller 44 at 360 Hz, 555 Hz and 800 Hz, respectively. As seen in FIG. 10, the current waveform 58 at an input frequency of 360 Hz remains at zero during a substantial beginning portion 58a of the first half cycle. Then, the current rises rapidly to its maximum flow. At the beginning of the second half cycle, the current remains at zero for a delay period shown at 58b, and then rapidly increases to its maximum negative value before completing the cycle.

As shown in FIG. 11, the current waveform 60 for an input frequency of 550 Hz exhibits current delays at 60a, 60b which are shorter in duration than the corresponding delays 58a, 58b shown in FIG. 10.

As can be seen in FIG. 12, the current waveform 62 at 800 Hz results in even shorter delays 62a, 62b before the current is allowed to start flowing in each half cycle. As previously indicated, the actual RMS values of current supplied to the motor 46 are approximately equal at all three frequencies respectively shown in FIGS. 10-12.

Figure 13:
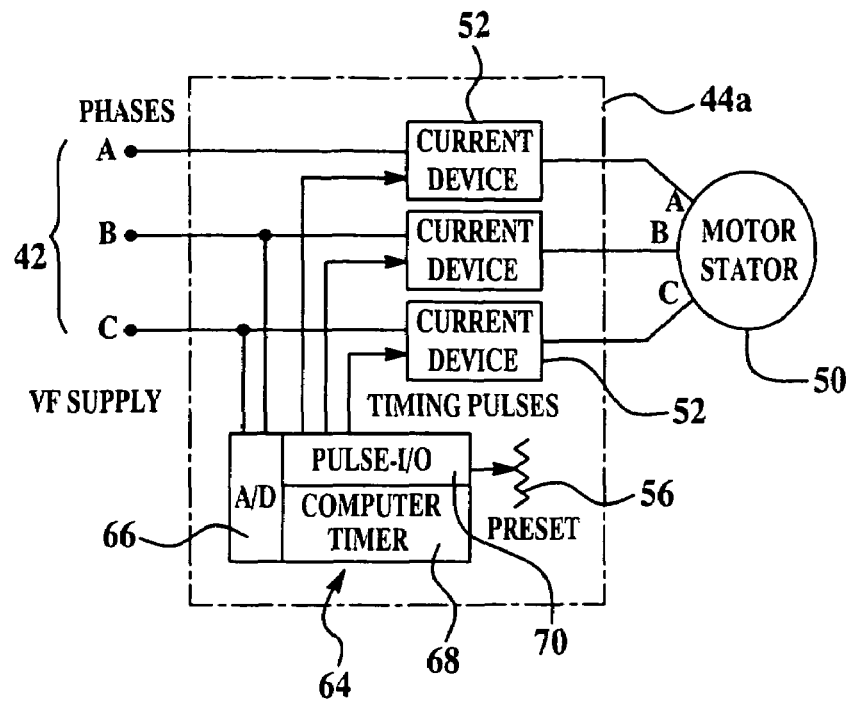
FIG. 13 is a block diagram as an alternate embodiment of the power controller of the present invention.

Attention is now directed to FIG. 13 which depicts an alternate form of the power controller 44a used to control the power delivered from the AC power source to the motor stator 50, in which digital, rather than analog techniques are used. A control circuit 64 includes an A-to-D converter 66 which detects the input frequency of the power present on phases B and C and converts this frequency to a digital value. A computer 68, which includes a time base and a counter, includes a stored algorithm for determining the time delay before switching on the current devices 52. The computer may comprise, for example, an INTEL 87C196JT micro-controller which includes the functions of A/D conversions, timers, counters, RAM, calculation cpu, and binary pulse outputs.

The algorithm may comprise a simple lookup table in which the appropriate time delay is determined based on the detected input frequency. Thus, for a given input frequency, the computer 68 determines the appropriate time delay for each phase and controls a pulse generator 70 to produce a series of timing pulses which are delivered to the current control devices 52 at the appropriate time in order to connect the motor stator 50 with the power source 42. A preset 56, which may comprise a voltage produced by a potentiometer, is used to control the pulse generator 70 in order to tailor the output of the power controller 44a to the particular characteristics of each individual motor 46.

Figure 14:
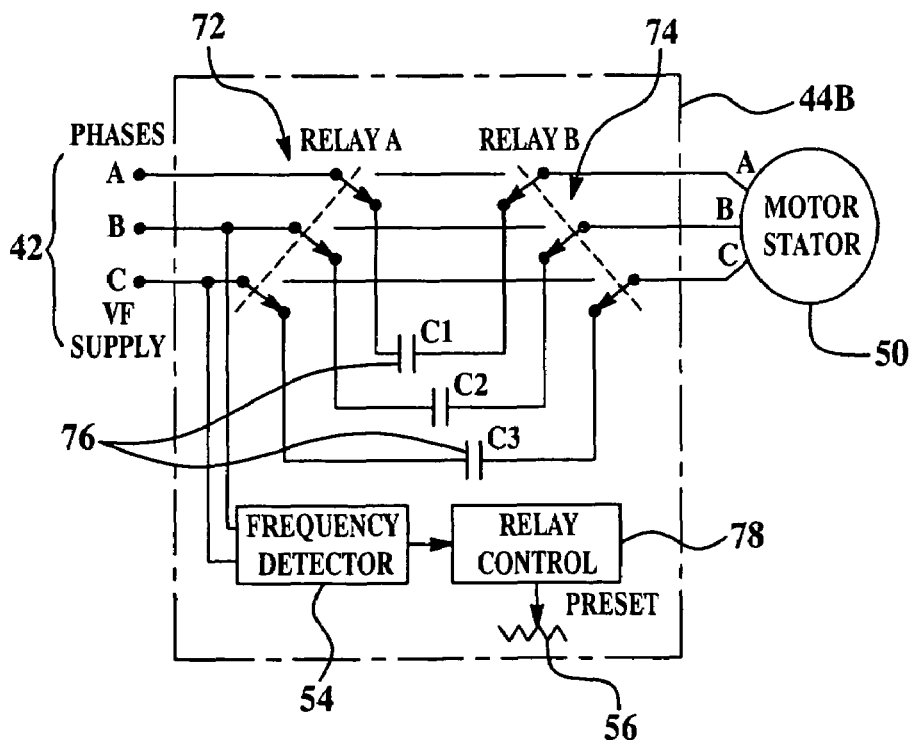
FIG. 14 is a block diagram of another embodiment of the present invention.

FIG. 14 depicts another embodiment of the power controller 44b for controlling the current delivered to the motor stator 50 as a function of the input frequency of the power source 42. First and second sets of relay contacts 72, 74 respectively, switch three capacitors 76 into the respective circuits for phases A B and C which supply current to motor 50. Relay contacts 72, 74 are controlled by a relay control 78 which, similar to the previously described embodiments, includes a preset 56 in order to better tune the response of the controller 44b to a particular motor. A frequency detector 54 is coupled to two phases of the input power 42 and functions to determine the frequency of the input power supply. The detected frequency is delivered to the relay control 78 which may include logic circuit or a computer which causes the relay contacts 72, 74 to open or close depending upon the detected frequency.

When a frequency is detected that requires limiting of the input currents to the stator 50, the relay control 78 switches contacts 72, 74 from their first positions in which the input power 42 is connected directly to the stator, to a second position in which the capacitors 76 are connected in series with each phase of the input power 42 to the motor stator 50. Switching the capacitor 76 into series between the power source 42 and the motor stator 50 results in capacitive reactance being introduced into the supply circuit for each phase. Capacitors 76 are selected such that the value of the capacitive reactance is similar to but larger than the reactance of the inductive motor 46 at mid-range and lower frequencies. Since the capacitive reactance provided by capacitors 76 is larger at lower input frequencies, and opposite in phase reactants to the reactance of the motor 46, the effective total reactance at lower frequencies results in limiting the current supplied to the motor 46. Preferably, the capacitors 76 should be power capacitors having low equilivant series resistance (ESR) which reduces internal heat generation and are capable of running at the full AC power current of the motor 46 during the typical motor work periods.

Figure 15:
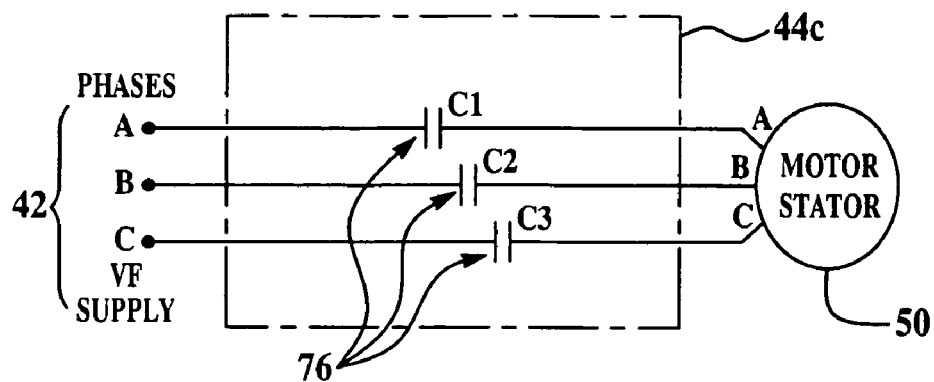
FIG. 15 is a schematic diagram of a further embodiment of the invention.

Attention is now directed to FIG. 15 which shows a further embodiment of the power controller 44 of the present invention. In this embodiment, capacitive reactance in the form of capacitors 76 are permanently connected in series, respectively with the three phases of the power source 42 and the motor stator 50. As in the embodiment shown in FIG. 14, the capacitive reactance supplied by capacitors 76 is similar to but larger than the inductive reactance of the motor 46 in the mid-range and lower frequencies of input power. Since the capacitive reactance is greater at lower frequencies and opposite in phase to the inductive reactance of the motor 46, the effective reactance at lower frequencies achieves a desirable current profile useful in limiting motor current at the lower input frequencies.

Figure 16:
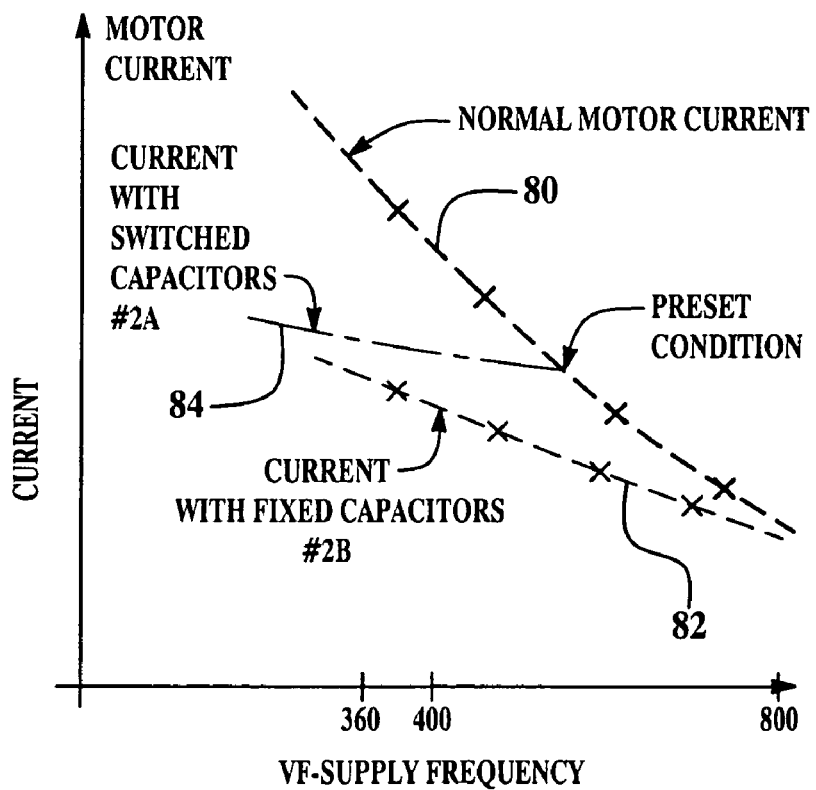
FIG. 16 is a plot of motor current vs. input frequency and showing the improved current reduction characteristics of the power controllers of FIGS. 11 and 12.

FIG. 16 is a plot of current versus input supply frequency showing the normal motor current 80 without use of the power controller 44, along with the current flow 84 resulting from use of power controller 44b, and current curve 82 which represents the current flow achieved with the power controller 44c. From FIG. 16, it may be appreciated that while the embodiment of the power controller 44b allows higher current flows at the upper frequencies and reduced current flow at the lower frequencies, the power controller 44c of FIG. 15, although yielding lower current flows at higher frequencies compared to the power controller 44b, may be entirely unsuitable for some motor applications.

Although this invention has been described with respect to certain exemplary embodiments, it is to be understood that the specific embodiments are for purposes of illustration and not limitation, as other variations will occur to those of skill in the art.

What is claimed is:

1. A device for controlling variable frequency AC power supplied to an induction motor, comprising:
    a detector that detects the frequency of a variable frequency AC power source supplied to the motor; and,
    a control circuit that controls current by supplying a substantially constant total current to the motor from the variable frequency AC power source that does not vary in response to the frequency detected from the variable frequency AC power source by the detector; said control circuit includes:
    an analog-to-digital converter for converting the analog value of the detected frequency to a digital signal,
    a timing pulse generator for generating anti-phase timing pulses related to the value of the detected frequency, and,
    a switch responsive to the anti-phase timing pulses for switching current for each phase of the AC power to the motor.

2. The device of claim 1, wherein the switch includes a switching transistor.

3. The device of claim 1, wherein the switch includes a silicon controlled rectifier.

4. The device of claim 1, wherein the control circuit includes an adjustment including using a voltage preset for adjusting the timing of the anti-phase timing pulses generated by the timing pulse generator based on characteristics of the motor.

5. The device of claim 1, wherein the control circuit includes a stored algorithm for determining the timing of the anti-phase timing pulses based on the detected frequency and for controlling the time pulse generator based on the determined pulse timing.

6. The device of claim 1, wherein the control circuit includes:
    two or more R-L-C networks that operate to produce a non-linear phase-shift/frequency response,
    an anti-phase timing pulse network to provide anti-phase timing pulses output to a switching circuit, and
    a switching circuit responsive to anti-phase timing pulses generated by the RLC network and the anti-phase timing pulse network based on the detected frequency from the variable frequency AC power source for selectively connecting the capacitive reactance into a circuit coupling the power supply with the motor.

7. The device of claim 1, wherein the control circuit includes:
    a circuit for delaying the phase of the variable frequency AC power source based on the detected frequency and for generating anti-phase timing control pulses, and
    a current switching circuit responsive to the anti-phase timing control pulses for switching and limiting current supplied from the variable frequency AC power source to the motor at lower frequencies in a range of frequencies ranging between 360 hertz to 800 hertz.

8. The device off claim 1, wherein the current supplied to the motor includes:
    a constant RMS value that does not vary in response to the detected input frequency.

9. A device for controlling power supplied by a variable frequency AC power source to an induction motor over a range of frequencies, comprising:
    a reactive capacitance circuit coupled between the a variable frequency AC power source and the motor for limiting the current supplied to the motor from the variable frequency AC power source at lower frequencies in the range of frequencies ranging between 360 hertz to 800 hertz, wherein the reactive capacitance circuit produces a non-linear phase-shift/frequency response;
    an anti-phase pulse network that outputs anti-phase pulses to a current switching circuit; and,
    a current switching circuit responsive to anti-phase pulses generated by the reactive capacitance circuit and the anti-phase pulse network based on the detected frequency from the a variable frequency AC power source for selectively connecting the capacitive reactance into a circuit coupling the power supply with the motor to input a substantially constant current into the motor.

10. The device of claim 9, wherein the capacitive reactance in the capacitive reactance circuit is larger than the reactance of the motor at middle and lower frequencies in the range of frequencies.

11. The device of claim 9, wherein the capacitive reactance circuit includes a power capacitor having low equivalent series resistance.

* * * * *